United States Patent [19]

Choi

[11] Patent Number: 4,905,543

[45] Date of Patent: Mar. 6, 1990

[54] DEVICE FOR TURNING A MONITOR

[75] Inventor: Soo I. Choi, Kyungsangbook, Rep. of Korea

[73] Assignee: Goldstar Co., Ltd., Seoul, Rep. of Korea

[21] Appl. No.: 137,503

[22] Filed: Dec. 22, 1987

[30] Foreign Application Priority Data

Dec. 30, 1986 [KR] Rep. of Korea .............. 21739/1986

[51] Int. Cl.[4] ............................................. A47B 96/00
[52] U.S. Cl. ................................... 74/827; 74/813 R; 74/569; 74/337.5; 74/378; 248/349; 248/922
[58] Field of Search ................... 74/321, 337.5, 378, 74/379, 404, 813 R, 826, 827, 567, 569; 248/349, DIG. 1 H; 108/20

[56] References Cited

U.S. PATENT DOCUMENTS

| 803,522 | 10/1905 | Barnes | 74/378 |
|---|---|---|---|
| 1,017,441 | 2/1912 | Milne | 74/378 |
| 1,699,463 | 8/1927 | Cresci | 248/349 |
| 4,555,990 | 12/1985 | Egawa | 248/349 |

Primary Examiner—Gary L. Smith
Assistant Examiner—Flemming Saether
Attorney, Agent, or Firm—Rosen, Dainow & Jacobs

[57] ABSTRACT

A device for turning a monitor to a position at which a viewer can comfortably see the monitor. The device comprises a turntable carrying a monitor thereon, a cam shaft adapted to rotate the turntable in a desired direction utilizing a cylindrical cam having at an outer surface thereof an arc-shaped cam groove. The cam shaft receives a drive force from a drive motor via a reduction gear mechanism.

11 Claims, 2 Drawing Sheets

U.S. Patent  Mar. 6, 1990  Sheet 1 of 2  4,905,543
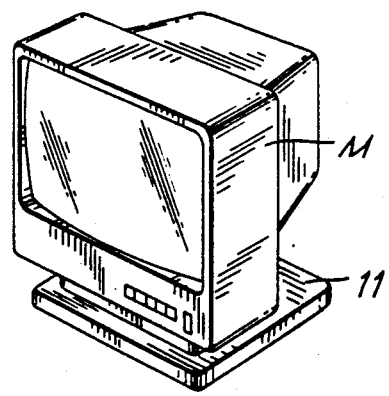
FIG. 1
FIG. 2
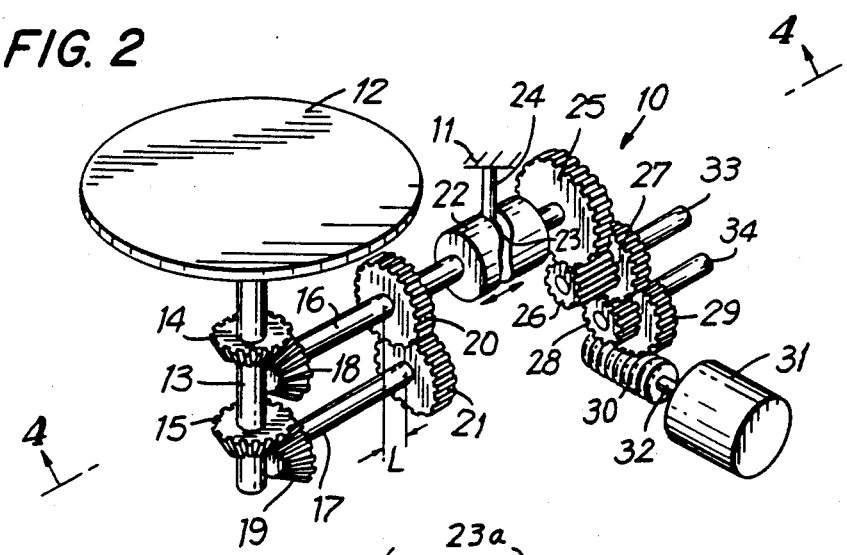
FIG. 3
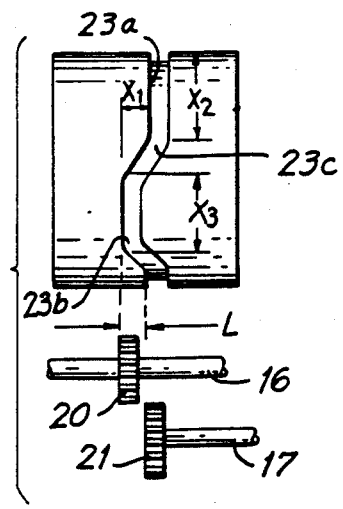

4,905,543

DEVICE FOR TURNING A MONITOR

BACKGROUND OF THE INVENTION

1. Field of the Invention

The present invention relates to a device for turning a television or monitor of a micro computer to a position at which a viewer or operator can comfortably see the television or monitor.

2. Description of the Prior Art

Generally, in order that a viewer can clearly see the content indicated on the screen of the television or monitor, it is necessary to orient the screen toward the front of the viewer.

In the conventional television or monitor, the orientation of the screen is fixed. As a result, when the viewer has to see the screen at the front, the viewer turns the monitor such that the screen is oriented toward the front of the viewer, or lifts and moves the monitor such that the screen is oriented toward the front of the viewer.

However, such works for orienting the screen toward the front of the viewer are limited, depending upon the arrangement of the television or computer system.

In order to eliminate such disadvantage, a device for turning a television or monitor right or left has been proposed. However, this device has to be manually operated, thereby causing the manipulation thereof to be troublesome. Furthermore, a remote control of the device is impossible.

SUMMARY OF THE INVENTION

Therefore, an object of the present invention is to provide a device for turning a monitor which can eliminate the above-mentioned disadvantages encountered in the prior art.

The other object of the present invention is to provide a device for turning a monitor wherein the television or monitor can be turned to a position at which the viewer can comfortably see the screen.

Another object of the present invention is to provide a, device for turning a monitor which enables a remote control.

In accordance with the present invention, these objects are accomplished by providing a device for turning a monitor comprising a casing; a turntable disposed at the upper portion of said casing, said turntable carrying a television or monitor thereon; a rotating shaft fixed to said turntable and extending into the interior of said casing, said rotating shaft having upper and lower bevel gears; a cam shaft horizontally disposed at the side of said rotating shaft and being rotatable and shiftable; a shaft rotatably disposed below said cam shaft a bevel gear fixedly mounted to one end of said cam shaft and another bevel gear fixedly mounted to one end of said shaft disposed below said cam shaft; a pair of gears selectively engage with each other one gear fixedly mounted to the middle portion of said cam gear and the other gear fixedly mounted to the other end of the shaft disposed below said cam shaft, a cylindrical cam fixedly mounted on said cam shaft, at the position between said middle gear of the cam shaft and the other end of the cam shaft, said cam having at its outer surface thereof an arc-shaped cam groove, a cam protrusion fixed to said casing and engaged in said cam groove of the cam; a transmission gear fixedly mounted to said other end of the cam shaft and a reduction means operatively connecting said transmission gear and a drive motor, said means including a plurality of reduction gears, worm gears, and a worm.

The rotating shaft and the shaft disposed below the cam shaft are rotatably supported within the casing. The cam shaft is shiftably and rotatably supported within the casing.

The lower bevel gear of the rotating shaft is always engaged with the bevel gear of the shaft disposed below the cam shaft. The bevel gear of the cam shaft is selectively engaged with the upper bevel gear of the rotating shaft, depending upon the longitudinal shift of the cam shaft which is carried out by the co-action of the cylindrical cam and the cam protrusion. The gears which are fixed to the middle of the cam shaft and the other end of the shaft disposed below the cam shaft are engaged with or disengaged from each other, as the bevel gear of the cam shaft is disengaged from or engaged with the upper bevel gear of the rotating shaft.

The reduction gear engaging with the transmission gear fixed to the other end of the cam shaft is so wide that when the transmission gear is shifted due to the shift of the cam shaft, the transmission gear is not disengaged from the above-mentioned reduction gear.

The shaft of each reduction gear is supported by the casing. The drive motor is fixedly mounted within the casing.

BRIEF DESCRIPTION OF THE DRAWINGS

These and other objects of the present invention will be more apparent from the following description taken in conjunction, with the drawings, wherein:

FIG. 1 is a perspective view of a television or monitor to which a device for turning a monitor of the present invention is applied;

FIG. 2 is a perspective view of a device for turning a monitor, from which a casing is omitted;

FIG. 3 is a side elevation of a portion of the gear assembly of FIG. 2 including gears 20 and 21 and a developed view of a cylindrical cam of FIG. 2, showing a relation of a rotating angle and a shifted distance according to the rotation of the cam;

DETAILED DESCRIPTION OF THE PREFERRED EMBODIMENT

Figure 4:
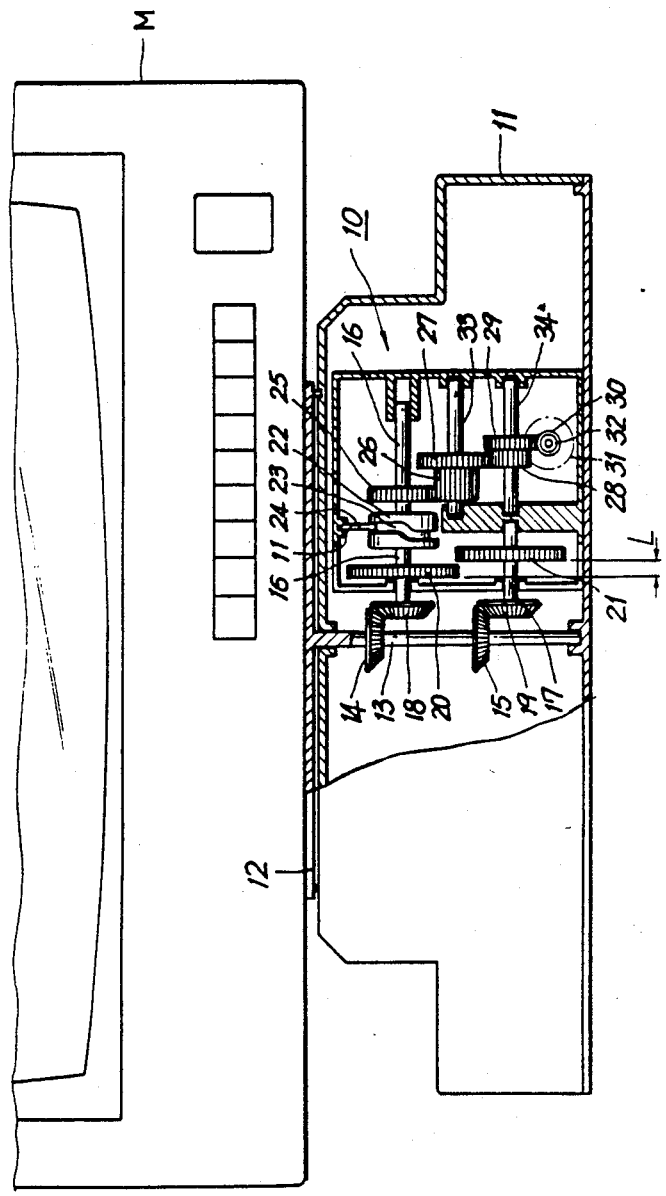
FIG. 4 is a front view of the television or monitor as shown in FIG. 1 and a side view of the device for turning it taken along the line 4—4 of FIG. 2.

Referring to FIGS. 1 to 4, there is shown a device for turning a monitor in accordance with the present invention, which comprises a casing 11 and a turntable 12 disposed at the upper portion of said casing. On the turntable 12, a television or monitor M is seated. The turntable 12 is rotatable within the casing 11 by means of a rotating shaft 13 fixed to the center portion of said turntable and downwardly extending therefrom.

Upper and lower bevel gears 14 and 15 are fixedly mounted on the rotating shaft 13 and spaced from each other by a certain distance. At one side of the rotating shaft 13, a cam shaft 16 is disposed to form a right angle with said rotating shaft 13. The cam shaft 16 is rotatable and shiftable longitudinally within the casing 11. a shaft 17 is rotatably disposed below the cam shaft 16.

At one end of the cam shaft 16, a bevel gear 18 is fixedly mounted, which can be selectively engaged with the upper bevel gear 14, depending upon the horizontal movement of the cam shaft 16. At one end of the shaft 17, a bevel gear 19 is also fixedly mounted, which is always engaged with the lower bevel gear 15.

A gear 20 is fixedly mounted on the middle portion of the cam shaft 16. The shaft 17 is provided at the other end thereof with a gear 21 engageable with the gear 20. The gears 20 and 21 engage with each other when the bevel gear 18 fixed on the cam shaft 16 is disengaged from the bevel gear 14 of the rotating shaft 13. On the other hand, when the bevel gear 18 engages with the bevel gear 14, the gears 20 and 21 are disengaged from each other.

The cam shaft 16 has a cylindrical cam 22 fixedly mounted between the gear 20 and the other end of the cam shaft. The cylindrical cam 22 is provided at the outer surface thereof with an arc-shaped cam groove 23 which includes a frontward shifting portion 23a, a backward shifting portion 23b, and an inclined portion 23a disposed between said shifting portions as shown in FIG. 3. In the cam groove 23, a cam protrusion 24 which downwardly extends from the casing 11 is received. As the cylindrical cam 22 is rotated together with the cam shaft 16, the cam shaft 16 can be longitudinally shifted by virtue of the camming action of the cam groove 23 and the cam protrusion 24. Depending upon the shift of the cam shaft 16, the bevel gear 18 fixed on the cam shaft 16 is engaged with or disengaged from the bevel gear 14. And also, the gear 20 is disengaged from or engaged with the gear 21.

At the other end of the cam shaft 16, a transmission gear 25 is fixedly mounted, which is connected to a drive motor 31, via reduction gears 26, 27, and 28, a worm gear 29, and a worm 30.

Reduction gears 26 and 27 are integrally formed with each other and its shaft 33 is supported by the casing 11. Similarly, the reduction gear 28 and the worm gear 29 are integrally formed with each other and its shaft 34 is supported to the casing 11.

The motor 31 is fixedly mounted within the casing 11. The worm 30 which engages with the worm gear 29 is fixed to the drive shaft 32 of the drive motor 31.

The reduction gear 26 is formed so wide that it always engages with the transmission gear 25, irrespective of the shift of the cam shaft 16. That is, the width of the reduction gear 26 is not less than the sum of the width of the transmission gear 25 and the shifted distance of the transmission gear 25 ($X_1$, in FIG. 3).

Under the condition when the bevel gear 18 fixed to the cam shaft 16 engages with the upper bevel gear 14 of the rotating shaft 13, the distance L between the gears 20 and 21 is identical to the shifted distance X1 of the cam shaft 16.

The support of the rotating shaft 13, the cam shaft 16, the shaft 17, and the gear shafts 33 and 34 to the casing 11 can be accomplished by a conventional means. Therefore, this means is not shown in FIG. 2.

The drive motor 31 can be operated by the manipulation of an electric power switch or remote control thereof. Such control device is well known in this technical field, and so, the illustration and description thereof is omitted herein.

Now, the operation of the above-mentioned device of the present invention will be described in detail.

When the bevel gear 18 of the cam shaft 16 is engaged with the upper bevel gear 14 of the rotating shaft 13 and the gear 20 is disengaged from the gear 21 of the shaft 17, as shown in FIG. 2, the cam protrusion 24 is engaged in the forward shifting portion of the cam groove 23 of the cylindrical cam 22.

When the drive motor 31 is operated by the manipulation of an electric power switch (not shown) or a remote control means (not shown) under the above-mentioned condition, the transmission gear 25 rotates at a reduced rate via the worm 30, the worm gear 29, and the reduction gears 28, 27, and 26, so that the cam shaft 16 rotates. By the rotation of the cam shaft 16, the rotating shaft 13 rotates via the bevel gear 18 and the upper bevel gear 14. Accordingly, the turning plate 12 which is fixed to the upper end of the rotating shaft 13 rotates with respect to the casing 11, thereby causing the monitor M to turn.

Assuming that the rotation direction at this time is the positive direction, the turntable 12 turns in the positive direction, during when the cam protrusion 24 is engaged in the forward shifting portion 23a of the cam groove 23 of the cylindrical cam 22, that is, when the cylindrical cam 22 rotates by the distance $X_2$ in FIG. 3.

When the cam protrusion 24 reached the inclined portion 23c of the cam groove 23 as the cylindrical cam 22 further rotates, the cam shaft 16 starts to be backwardly shifted. When the cam protrusion 24 reaches the backward shifting portion 23b of the cam groove 23, the bevel gear 18 fixed to one end of the cam shaft 16 is disengaged from the upper bevel gear 14 of the rotating shaft 13, and the gear 20 is engaged with the gear 21 of the shaft 17.

Although the transmission gear 25 is backwardly shifted by the backward shift of the cam shaft 16, it keeps engagement with the reduction gear 26, since the width of the reduction gear 26 is not less than the sum of the width of the transmission gear 25 and the shifted distance $X_1$ of the transmission gear 25.

Accordingly, the rotation of the cam shaft (in the positive direction) is transmitted to the shaft 17 via the gears 20 and 21, so that the shaft 17 rotates in the negative direction. By the rotation of the shaft 17, the rotating shaft and the turntable 12 rotate in the negative direction via the bevel gears 19 and 15 which always engage with each other. Thus, the monitor M turns in the negative direction.

Under the above condition, the turntable 12 rotates in the negative direction, during which the cam protrusion 24 is engaged in the backward shifting portion of the cam groove 23 of the cylindrical cam 22, that is, when the cylindrical cam 22 rotates by the distance $X_3$ in FIG. 3.

When the cam protrusion 24 is again engaged in the forward shifting portion 23a, after passing through the inclined portion 23c of the cam groove 23, the turntable 12 rotates in the positive direction, as described above.

Thus, the monitor M seated on the turntable 12 turns right or left by a certain angle which is determined by the lengths $X_2$ and $X_3$ of the forward and backward shifting portions of the cam groove 23 formed on the cylindrical cam 22.

As apparent from the above description, the device for turning a monitor in accordance with the present invention can turn the television or the monitor M to a position at which a viewer can comfortably see the screen, only by the manipulation of the switch. If desired, the orientation of the screen can be controlled at a remote place, by using a remote control means.

It is to be understood that the present invention is not limited to the description and accompanying drawings, and various modifications and changes may be made without departing from the scope and spirit of the invention.

For example, the assembly of the reduction gears 26, 27, and 28, the worm gear 29, and the worm 30 which are adapted to connect the transmission gear 25 and the drive motor 31 may be substituted by a well-known reduction means. The cylindrical cam 22 and the cam protrusion 24 may be substituted by other cam means, as far as they can shift the cam shaft.

What is claimed is:

1. A device for turning a television or monitor to a desired position thereof comprising:
   a casing supporting said television or monitor thereon;
   a turntable fixedly mounted on the upper end of a rotating shaft which is disposed within said casing and upwardly protruding from said casing, said turntable being rotatable together with said rotating shaft;
   a cam shaft horizontally disposed at the side of said rotating shaft within said casing, said cam shaft being rotatable and shiftable;
   a lower shaft rotatably disposed below said cam shaft;
   upper and lower bevel gears fixedly mounted to said rotating shaft;
   a bevel gear fixedly mounted to one end of said cam shaft, said bevel gear selectively engageable with said upper bevel gear of the rotating shaft;
   another bevel gear fixedly mounted to one end of said shaft disposed below the cam shaft, said bevel gear continuously engaging with said lower bevel gear of the rotating shaft;
   a gear fixedly mounted on the middle portion of said cam shaft;
   another gear fixedly mounted to the other end of said lower shaft disposed below the cam shaft and selectively engageable with the gear mounted on the middle portion of said cam shaft;
   a cylindrical cam fixedly mounted on said cam shaft, at the position between said middle gear of the cam shaft and the other end of the cam shaft, said cam having at its outer surface thereof a cam groove;
   a cam protrusion fixed to said casing and engaged in said cam groove of the cam;
   a transmission gear fixedly mounted to said other end of the cam shaft; and
   a reduction means operatively connecting said transmission gear and a drive motor, said means including a plurality of reduction gears, worm gears, and a worm.

2. A device in accordance with claim 1, wherein said cam groove formed on the cylindrical cam includes a forward shifting portion having a length $X_2$ which provides a rotation of said turntable by a certain angle in one direction, a backward shifting portion having a length $X_3$ which provides a rotation of said turntable by a certain angle in the opposed direction, and an inclined portion disposed between said shifting portions and having a width $X_1$ which provides a shiftment of the cam shaft.

3. A device in accordance with claim 1, wherein the width of said reduction gear engaging with the transmission gear is not less than the sum of the width of the transmission gear and the shifted distance $X_1$ of the transmission gear.

4. A device, operable with a motor, for turning a television set or monitor clockwise and counter clockwise to desired positions, comprising:
   a base, a turntable rotatably carried by said case for supporting and rotating said television set or monitor,
   a drive mechanism mounted in said base for rotating said turntable, said drive mechanism comprising a vertical driving shaft connected to said turntable for rotating said turntable,
   spaced apart upper and lower bevel driven gears fixedly mounted to said driving shaft,
   a cam shaft horizontally disposed and being both rotatable when driven by said motor and horizontally shiftable while remaining drivably engaged to said motor,
   a first bevel drive gear fixedly mounted to one end of said cam shaft, said first bevel drive gear disposed so as to be selectively engageable with one of said upper and lower bevel driven gears,
   a rotatable axially fixed stationary reversing shaft situated generally parallel to said cam shaft,
   a second bevel drive gear fixedly mounted to one end of said reversing shaft, said second bevel drive gear continuously engaging said other bevel driven gear of said upper and lower bevel driven gears,
   a first spur gear fixedly mounted to said cam shaft,
   a second spur gear fixedly mounted to said reversing shaft and selectively engageable with said first spur gear, and
   cam means connected to said cam shaft for horizontally shifting said cam shaft to a first position whereby the first bevel drive gear engages one of said upper and lower bevel driven gears and a second position whereby said first bevel drive gear is disengaged from said on of said upper and lower bevel driven gears and whereby said second spur gear is engaged with said first spur gear.

5. The device in accordance with claim 4, wherein said cam means comprises a cylindrical cam formed by a cam grove at an outer surface of said cam shaft.

6. The device in accordance with claim 5, wherein said cam means further comprises a cam protrusion, fixed to said base and, engaged within said cam groove of said cam.

7. The device in accordance with claim 5, wherein said drive shaft is unitary.

8. A device for turning a television or monitor to a desired position, comprising;
   a casing for supporting said television or monitor,
   a turntable disposed within said casing
   a vertical driving shaft connected to said turntable for rotating said turntable,
   upper and lower bevel gears fixedly mounted to said driving shaft,
   a cam shaft, horizontally disposed, being both rotatable and horizontally shiftable,
   a first bevel gear fixedly mounted to one end of said cam shaft, said bevel gear disposed so as to be selectively engageable with one of said upper and lower bevel gears,
   a rotatable stationary reversing shaft,
   a second bevel gear fixedly mounted to one end of said reversing shaft, said second bevel gear continuously engaging said other bevel gear of said upper and lower bevel gears,
   a forward gear fixedly mounted to said cam shaft and spaced apart from first bevel gear,
   a reversing gear fixedly mounted to said reversing shaft spaced apart from said second bevel gear and selectively engageable with said forward gear, and caming means connected to said cam shaft for horizontally shifting said cam shafting to
   a first position whereby the first bevel gear engages one of said upper and lower bevel gears and
   a second position whereby said first bevel gear is disengaged from said one of said upper and lower gears and whereby said reversing gear is engaged with said forward gear.

9. The device in accordance with claims 8, wherein said caming means comprises a cylindrical cam fixedly mounted on said cam shaft, said cam having a caming groove at an outer surface thereof.

10. The device in accordance with claim 9, wherein said caming means further comprises a cam protrusion, fixed to said casing, engaged within said caming groove of said cam.

11. The device in accordance with claim 9 wherein said drive shaft is unitary.

* * * * *